(12) United States Patent
Houlihan et al.

(10) Patent No.: US 12,129,322 B2
(45) Date of Patent: Oct. 29, 2024

(54) ANAEROBICALLY CURABLE COMPOSITIONS COMPRISING A METALLACENE AND ACETYL PHENYL HYDRAZINE CURING SYSTEM

(71) Applicant: Henkel AG & Co. KGaA, Dusseldorf (DE)

(72) Inventors: James Houlihan, Dublin (IE); Nigel Sweeney, Dublin (IE); Brendan Kneafsey, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 766 days.

(21) Appl. No.: 17/150,790

(22) Filed: Jan. 15, 2021

(65) Prior Publication Data

US 2021/0139627 A1 May 13, 2021

Related U.S. Application Data

(63) Continuation of application No. PCT/EP2019/069985, filed on Jul. 24, 2019.

(30) Foreign Application Priority Data

Jul. 25, 2018 (GB) ...................... 1812113

(51) Int. Cl.
| | |
|---|---|
| C08G 18/67 | (2006.01) |
| C08F 283/00 | (2006.01) |
| C08G 18/24 | (2006.01) |
| C08G 18/76 | (2006.01) |
| C08J 3/24 | (2006.01) |
| C08K 5/00 | (2006.01) |
| C08K 5/14 | (2006.01) |
| C08K 5/24 | (2006.01) |
| C08K 5/56 | (2006.01) |
| C08K 9/10 | (2006.01) |

(52) U.S. Cl.
CPC ........ *C08F 283/006* (2013.01); *C08G 18/246* (2013.01); *C08G 18/672* (2013.01); *C08G 18/7621* (2013.01); *C08J 3/24* (2013.01); *C08K 5/0025* (2013.01); *C08K 5/14* (2013.01); *C08K 5/24* (2013.01); *C08K 5/56* (2013.01); *C08K 9/10* (2013.01); *C08G 2170/00* (2013.01); *C08J 2333/12* (2013.01); *C08J 2375/06* (2013.01)

(58) Field of Classification Search
CPC ........... C08F 283/00; C08K 5/00; C08K 5/24; C08K 5/56; C08K 9/10; C08K 5/14; C08J 3/24; C08G 18/67

USPC ........................................................ 523/176
See application file for complete search history.

(56) References Cited

U.S. PATENT DOCUMENTS

| | | | |
|---|---|---|---|
| 3,218,305 A | 11/1965 | Krieble | |
| 3,425,988 A | 2/1969 | Gorman et al. | |
| 4,180,640 A | 12/1979 | Melody et al. | |
| 4,287,330 A | 9/1981 | Rich | |
| 4,321,349 A | 3/1982 | Rich | |
| 4,533,446 A * | 8/1985 | Conway | C08F 290/06 522/15 |
| 5,605,999 A | 2/1997 | Chu et al. | |
| 2008/0251195 A1 * | 10/2008 | Malofsky | C09J 5/00 525/360 |

FOREIGN PATENT DOCUMENTS

| | | |
|---|---|---|
| CN | 102558490 | 7/2012 |
| EP | 0077659 | 4/1983 |
| EP | 0134677 | 3/1985 |
| EP | 0548369 | 6/1993 |
| FR | 1581361 | 9/1969 |
| WO | 200029456 | 5/2000 |
| WO | 2004024841 | 3/2004 |
| WO | 2017068196 | 4/2017 |
| WO | WO-2017068196 A1 * | 4/2017 ............. B05D 3/067 |

OTHER PUBLICATIONS

International Search Report issued in connection with International Application No. PCT/EP2019/069985 mailed on Oct. 9, 2019.
Rich, Richard D. "Anaerobic Adhesives", Handbook of Adhesive Technology, ed. Pizza, A and Mittal, K.L. Marcel Dekker, Inc., Chapter 2, 1994, pp. 467-479.

* cited by examiner

*Primary Examiner* — Deve V Hall
(74) *Attorney, Agent, or Firm* — Steven C. Bauman

(57) ABSTRACT

An anaerobically curable composition comprising (i) a curing system for curing an anaerobically curable component, comprising a combination of a metallocene such as n-butyl ferrocene and acetyl phenyl hydrazine, (ii) the anaerobically curable component comprising: a) a solid resin component and b) a solid anaerobically curable monomer; and wherein the composition is in solid form and has a melting point in the range from 30° C. to 100° C. The metallocene may be present in the amount from about 0.05% to about 2.5% by weight based on the total weight of the composition and the acetyl phenyl hydrazine is present in the amount from about 0.05% to about 1.75% by weight based on the total weight of the composition. Compositions show greater bond strengths.

27 Claims, No Drawings

ANAEROBICALLY CURABLE COMPOSITIONS COMPRISING A METALLACENE AND ACETYL PHENYL HYDRAZINE CURING SYSTEM

BACKGROUND

Field

The present invention relates to a curable composition which can be pre-applied to an article for example in the form of a non-mobile, substantially non-tacky coating. The article can thus be conveniently handled, packed, transported and stored for an extended period, after which the coating (or a part thereof) can be caused to cure at a selected time. Of particular interest is a curable composition that cures anaerobically. A composition that can be pre-applied to an article in the form of a non-mobile, substantially non-tacky coating and then later cured anaerobically is of interest. One end-use application of such compositions is as threadlockers.

Brief Description of Related Technology

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds. Anaerobic adhesive compositions are well known for their ability to remain in a liquid, unpolymerized state in the presence of oxygen and to cure to a solid state upon the exclusion of oxygen.

Oftentimes anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

Anaerobically curable adhesive compositions also commonly include chelators such as ethylenediamine tetraacetic acid (EDTA) which are employed to sequester metal ions.

Preparation of anaerobically curable compositions which includes an anaerobically curable component typically involves a liquid carrier component. The composition is thus typically in a liquid form and may be dispensed, for example by an applicator. For use, the anaerobically curable component is applied by a suitable applicator, to form a layer or coating on the surface. Often anaerobically curable compositions are applied as a bead, for example a continuous bead to form a gasket.

The anaerobically curable material often remains wet even after application until exposed to anaerobic conditions suitable for cure. For example in many cases an anaerobic curable composition contains a liquid monomer.

Even though the anaerobic curable composition may dry off somewhat, for example through evaporation (by being dried, or allowed to dry for a period), the material often remains wet and tacky. This leads to: potential contamination of anything that contacts the articles to which the material has been applied; and also unwanted removal of the material which has been applied. The latter concern potentially compromises the integrity of any bond or seal later formed by the anaerobically curable composition because an insufficient amount may remain to form the desired bond or seal.

And of course where the liquid carrier material is itself the liquid monomer, it will remain in its liquid form until such time as it is anaerobically cured. So even though these compositions may be applied on a substrate, awaiting exposure to anaerobic conditions, they will remain wet or at least tacky until cured.

In the past additional components such as thickeners have been added to the material to make it less flowable, but because other components are liquid, the overall composition remains somewhat flowable and/or tacky.

Tape products have existed, for example Loctite® 249 Quicktape. This product consists of a liquid anaerobic threadlocker, sandwiched between two films of non-reactive polyimide/polyurethane film.

Compositions, including those that are suitable for use in threadlocking applications may be applied in a dry to touch form but with later stage anaerobic cure functionality. To achieve this additional components are often used.

In some cases a dry to touch form is achieved using a cure mechanism. For example a first cure mechanism may form the dry to touch form so as to hold the composition in place on an article while a second (anaerobic) cure mechanism is activated later to achieve cure, for example to achieve threadlocking.

For example European Patent No. 0 077 659 (Thompson) describes a pre-applied polymerizable fluid for sealing and locking engineering parts. The composition has two mechanisms for curing and two curing reactions take place. The first mechanism is a UV light cure. An opacifier is dispersed in the fluid so that the fluid becomes substantially opaque to radiation. After the fluid is applied to the component it is exposed to UV radiation whereupon a coating is formed, creating a surface layer which is a dry, tack-free crust. The subcutaneous fluid is unaffected by the radiation and remains in a generally liquid state. When the component is threaded into another the surface layer breaks and the second polymerisation (such as a free radical polymerization) is initiated and the second cure reaction takes place. The second polymerization mechanism acts to lock the threads together. In Thompson, only a skin is formed in the first polymerization and the remainder of the composition remains fluid below the skin. There is a risk therefore that during handling of the coated engineering parts the skin may be disrupted and the fluid composition may leak out.

European Patent No. 0 548 369 (Usami) describes a pre-applied adhesive composition for application to the threaded contact faces of a screw. The composition comprises a photo-hardening binder in which a secondary curable composition is dispersed. The secondary curable composition includes microencapsulated reactive monomer/activator/initiator.

International Patent Publication WO2004/024841 A2 (Haller) describes curable compositions for application to a threaded article. The composition comprises a dispersion of components of a first cure mechanism comprising: (a) a (meth)acrylate functional monomer component; (b) a (meth)acrylate functional oligomer component; and (c) a photoinitiator component; and (ii) components of a second cure mechanism comprising: (e) an amine component; and (f) an encapsulated epoxy resin component; together with (iii) a thickener component. The photoinitiator component is suitable upon irradiation of the composition to achieve a first cure through the depth of the composition applied to a threaded article so that a binder matrix is formed with the components of the second cure mechanism dispersed through the matrix.

An English language Abstract for Chinese patent publication CN102558490 seemingly discloses a hot-meltable prepolymer, which is an urethane or polyurethane (meth)acrylate prepolymer with (meth)acryloyl terminal groups. The melting point of the prepolymer is 50-80° C. An anaerobic adhesive is prepared from the hot-meltable prepolymer, monomer containing at least one acrylic ester group or methacryloyl group, promoter, stabilizer and initiator. Liquid monomers are combined with the prepolymer to form a gel.

International Patent Publication WO2017/068196 describes an anaerobically curable composition comprising an anaerobically curable component that is a combination of a solid resin component and a solid anaerobically curable monomer. A curing component for curing the anaerobically curable component is included. The composition is solid and has a melting point in the range from 30° C. to 100° C. The composition is dry to touch and can be used to form articles of manufacture such as a tape, an elongate filament, a gasket, a patch.

Notwithstanding the state of the art, it would be desirable to provide alternative anaerobically curable compositions that are suitable for typical end use applications including in threadlocking applications.

SUMMARY

The present invention provides new cure accelerators for anaerobically curable compositions. The anaerobically curable composition are typically used as adhesives or sealants, for example the compositions of the present invention may find application in threadlocking applications.

The present invention provides an anaerobically curable composition comprising:
  (i) a curing system for curing an anaerobically curable component, comprising a combination of a metallocene and acetyl phenyl hydrazine,
  (ii) the anaerobically curable component comprising:
    a) a solid resin component and
    b) a solid anaerobically curable monomer; and wherein the composition is in solid form (at room temperature) and has a melting point in the range from 30° C. to 100° C. Compositions of the invention show greater bond strengths.

The composition of the present invention may not contain saccharin. The presence of saccharin in the composition makes the composition cure in aerobic conditions which is undesirable for an anaerobically curable composition. That is the composition is no longer an anaerobically curable composition as it cures in aerobic conditions.

The curing system is for curing the curable component.

The curing system may be free from saccharin. The presence of saccharin in the curing system makes the composition cure in aerobic conditions which is undesirable for an anaerobically curable composition. That is the composition is no longer an anaerobically curable composition as it cures in aerobic conditions.

The curing system is typically present in an amount of from about 0.1 to about 10%, such as from about 1 to about 5%, for example about 5% by weight based on the total weight of the composition.

Desirably the cure system comprises cure-inducing components to induce anaerobic cure and may include one or more of toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

In the composition of the invention the curing system comprises a curing accelerator to accelerate anaerobic cure.

The curing accelerator comprises a metallocene and APH.

The curing accelerator comprises metallocene. Metallocenes are compounds which typically consist of two cyclopentadienyl anions bound to a metal centre having the formula $(C_5H_5)_2M$ wherein M is a metal. For example M may be a ferrous metal in which case the metallocene is ferrocene, for example the metallocene may be n-butyl ferrocene.

The metallocene may be present in an amount from about 0.05% to about 2.5%, such as from about 0.5% to about 2%, for example from about 1% to about 1.5%, by weight based on the total weight of the composition.

The curing accelerator comprises APH. APH may be present in an amount from about 0.05% to about 1.75%, such as from about 0.5% to about 1.5%, for example from about 1% to about 1.25% by weight based on the total weight of the composition.

Stabilizers such as quinone or hydroquinone may be included.

The composition of the invention is solid at ambient temperature and with a melting point in the range from about 30° C. to about 100° C. That is it is dimensionally stable or non-flowable at room temperature. For example a composition of the invention is not a gel.

The formulation of compositions of the invention provide the composition in solid tack-free form. The compositions of the invention may be suitable for application as a threadlocking formulation.

The anaerobically curable component, for example the solid resin component and/or the anaerobically curable monomer component, of a composition of the invention may act as a carrier for any other component.

One of the main benefits of a composition of the invention is that its components are in effect almost 100% reactive, for example at least 80% reactive, desirably at least 90% reactive, such as at least 95% reactive all by weight of the composition. Components, such as the solid resin and/or resin monomer which themselves participate in the anaerobic curing form the carrier (for example a matrix) in which other components may be carried, for example dispersed. For example the reactive solid components may be melted and blended together and other components can then be added. Once (re-)solidified the reactive solid components thus form a solid matrix in which the other components are held.

It will be appreciated that not all components of the invention have to be solid. For example it is usual that the curing system is in liquid form. Also a composition of the invention may include an anaerobically curable monomer in liquid form.

However whenever such component(s) are present the composition of the invention is formulated so that it is a solid.

It is desirable that any component, for example, initiator or monomer, that may be in liquid form is encapsulated. Encapsulating liquid components is advantageous as achieving an overall composition that is in solid form is facilitated by encapsulation.

Desirably liquid components whether encapsulated or not make up (by weight based on the overall weight of the composition) no more than 20% of the weight of the composition.

Melting and re-solidification may be measured by DSC (Differential Scanning calorimetry).

Compositions of the invention can be applied in any manner. One advantage is that the compositions of the invention can be made and/or applied to a substrate in a manner that does not require use of a solvent. Solvents—organic solvent or water—are thus not required. This avoids the necessity for a liquid carrier for the composition. A composition of the invention is essentially dry with consequent handling advantages. For example the compositions of the invention will flow in particulate form and there is no requirement for a liquid carrier, and there is no requirement for drying off of solvent or water to achieve application to a substrate.

Dry-handling of the product, for example on production lines, is thus both achievable and advantageous. Once applied (to a substrate) compositions of the invention will also be dry. Dry to touch products are desirable from a handling point of view to eliminate contamination, fouling, spillages, loss of composition from a substrate etc.

Compositions of the invention have many end-use applications as with traditional anaerobically curable compositions.

Compositions of the present invention have applications in metal-metal bonding, such as threadlocking compositions, for securing, for example a female threaded article to a male threaded article, e.g. for securing nuts and bolts. The product cures when confined in the absence of air between close fitting (e.g. metal) surfaces. It protects threads from rust and corrosion and prevents loosening from shock and vibration.

The compositions of the invention are suitable for storage or handling e.g. shipping even when applied on a part. This storage or handling does not adversely affect the integrity of the composition for example when it is present as a coating.

Mating surfaces such as flanges e.g. in the automotive industry, in the past have been sealed by applying a liquid anaerobically curable composition onto the face of one of the surfaces. The two surfaces, for example flange faces, are then assembled and the product cures in the absence of oxygen thereby creating a gasket and a seal.

This invention provides a composition suitable for, and a method of flange sealing whereby the composition is applied onto the surface of one of the flanges as a (curable) dry to touch pre-applied composition. For example a composition of the invention may be applied (by melting) as a warm flow liquid, for example at 80° C., but cools quickly and is dry to touch quickly, for example in less than 5 minutes. The part to be assembled thus has a pre-applied gasket on one surface and will not cure until the parts are assembled.

This invention provides a composition suitable for, and a method of applying a composition as a tape. This avoids the necessity for a carrier film and the process of applying the tape to a substrate such as a threaded part avoids a potential squeeze out of liquid material from between films onto the hands of the person using the material.

With the present invention the composition can take the form of a solid anaerobic formulation which is itself in the form of a reactive tape or filament that requires no additional carrier or backing film, and that be applied directly to the substrate. A tape or filament may be applied by winding i.e. in a similar manner to current PTFE tape or thread-sealing cord. It may also be applied by melting.

The resulting article with the applied material is dry-to-touch and can be stored until such time as assembly is required.

An anaerobic tape or elongate filament which is solid overall (resin, monomer and cure system) does not require an additional carrier or backing tape. A peroxide initiator may be encapsulated and only released when the microcaps are sheared for example during an assembly process. The tape can be applied at room temperature to the substrate, such as a metal bolt. A nut is then torqued onto the bolt initiating cure, for example by breaking the peroxide microcaps.

The viscosity of a melted composition of the invention can be controlled by increasing or decreasing the temperature.

A composition of the invention can be melted and dispensed onto a substrate onto a flange which may be optionally be of aluminium. The composition solidifies rapidly, for example within 2-3 minutes at room temperature without the need for any additional external cooling methods to produce a dry-to-touch, transfer-resistant solid material which may take the form of a coating. Thus the flange can be conveniently handled, packed, transported and stored for an extended period, after which the pre-applied sealant can be caused to cure by exposure to anaerobic conditions, such as occurs with assembly with a mating flange.

Furthermore, the compositions of the invention have shown long-term on-part stability. For example stability in excess of six months has been achieved.

A further advantage of the compositions of the present invention is that there is no cross contamination when a composition of the invention touches another article. For example, when fasteners are stored loosely together and in contact with each other, no cross contamination of the composition of the invention occurs.

In respect of the present invention tack free means dry to the touch yet the composition will not flake off during handling or use. For example an article to which the composition of the invention is applied shall be dry to the touch. An article to which a composition of the invention has been applied is considered dry to the touch if 20 of such articles are individually placed on dry tissue paper for four hours and there is no change in appearance of the tissue.

It is understood by the person skilled in the art that in order to apply compositions of the invention sufficient melting may be carried out to allow application of the composition to an article in a manner in which it adheres. Melting the material for application avoids the necessity for a liquid carrier for the composition. The expression tack free and dry to the touch relate to the composition after it has been (melted and) applied and then has (re-)solidified. A test to determine that the article is dry to the touch should only be conducted after the composition is no longer in melted form. For example the testing should be done at least about 30 minutes after the composition is applied.

To provide the composition in the desired particulate form it may initially be in a non-particulate form, for example as a continuous mass. To provide it in particulate form it may be ground. For example the composition may be micronized.

A composition of the invention may have a melting point from about 40° C. to about 100° C.

A composition of the invention may have a melting point from about 50° C. to about 100° C.

Such temperatures compare favourably with the temperatures utilised to dry liquid based formulations.

Any suitable anaerobically curable component may be used in the composition of the invention, preferably it allows the composition to be provided in flowable particulate form so that the particulate form has a melting point in the range from about 30° C. to about 100° C.

The anaerobically curable component comprises an anaerobically curable monomer. The anaerobically curable component comprises an anaerobically curable solid resin component. The solid resin component has functionality to make it curable by redox initiated polymerisation.

The anaerobically curable solid resin component may have a melting point in the range from about 50° C. to about 80° C. It may have a re-solidification point (after melting) in the range from about 30° C. to about 50° C. Having a re-solidification point in this range means that the material will re-solidify when ambient conditions have a temperature of 30° C. or lower. So the composition will re-solidify under typical ambient conditions. It is understood that re-solidification may not occur at a single temperature but instead occur over a temperature range. In any event for the purposes of this invention the end point temperature for re-solidification is desirably at or above 30° C.—that is when exposed to temperatures below the re-solidification point temperature the composition will turn back to its solid form. The anaerobically curable component comprises a solid anaerobically curable monomer and a solid resin component.

In a composition of the invention the anaerobically curable component may be a combination of separate/different components. Where the anaerobically curable component is a combination of separate/different components it is desirable that two or more, or indeed all of the components forming the anaerobically curable component have a melting point in the range from about 30° C. to about 100° C. It is desirable that at least two and desirably all components have a melting point in the range from about 30° C. to about 100° C.

Where the anaerobically curable component is a combination of separate/different components it is desirable that two or more, or indeed all of the components are solid, both when separate and when mixed.

Where the anaerobically curable component is a combination of separate/different components it is desirable that at least two, and desirably all components are anaerobically curable. Where there is more than one component desirably at least two and desirably are functional insofar as they participate in an anaerobic cure reaction. They are reactive.

It will be appreciated that other components may not participate in an anaerobic cure reaction. They are unreactive. Such components may however become part of the cure product having been incorporated therein during the curing of other components.

A composition of the invention includes a solid resin component wherein it is desirable that the resin is anaerobically curable (it participates in an anaerobic cure of the composition).

A composition of the invention includes a solid resin component and an anaerobically curable monomer wherein it is desirable that each have a melting point in the range from about 30° C. to about 100° C. In such a case each are solid.

A composition of the invention may be provided in an at least two-part form where a first part comprises a solid resin component and a second part comprises a solid anaerobically curable monomer.

In a composition of the invention the anaerobically curable component may be provided in powder form.

A composition of the invention includes a solid resin component wherein the solid resin component may be provided in a flowable particulate form, for example powder form.

A composition of the invention includes a solid anaerobically curable monomer, the anaerobically curable monomer may be provided in a flowable particulate form, for example powder form.

Where the anaerobically curable component is a combination of separate/different components the anaerobically curable component may be the product formed by melting the components and blending them together to form a solid blended product.

For example the anaerobically curable component may include the product formed by melting a solid resin component and a solid anaerobically curable monomer and blending them and forming a solid blended product.

A composition of the invention may include the product formed by reducing the solid blended product into a flowable particulate form.

It is desirable that in the composition of the invention the particulate form has an average particle size of less than about 500 µm. For example it is desirable that the composition has passed through a sieve that allows particles with a particle size of less than about 500 µm through. The particulate form may for example have a particle size from about 20 µm to about 500 µm.

In a composition of the invention the anaerobically curable component will typically be present in an amount of from about 80% to about 99% by weight of the total composition, for example from about 93 to about 97%.

Where a composition of the invention includes a solid resin component the solid resin component may be a radically polymerisable solid resin.

Where a composition of the invention includes a solid resin component the solid resin component may be anaerobically curable.

Where a composition of the invention includes a solid resin component, the solid resin component may be present in an amount of from about 10% to about 60%, such as from about 25% to about 50%, for example from about 20% to about 30% by weight based on the total weight of the composition.

The solid resin component may be selected from: (meth)acrylated polyurethane resins with a molecular weight of about 2,000 g/mol or higher; novolac resins with a molecular weight of about 2,000 g/mol or higher, (meth)acrylated polyester resins with a molecular weight of about 2,000 g/mol or higher and combinations thereof. For example the solid resin component may have a molecular weight in the range from 2,500 to 40,000 g/mol. The solid resin component may have a melt viscosity of from about 0.5 to about 20 Pa·s at 80° C. To dispense such compositions they may be melted and then allowed to cool. For example such compositions may be formed into stick form and applied then in melted form, by a suitable applicator for example using a hot-melt gun.

Where a composition of the invention includes an anaerobically curable monomer, it may be present in an amount of from about 40 to about 90%, such as from about 45 to about 85%, for example 50 to about 80% such as from about 45 to about 70% by weight based on the total weight of the composition.

The anaerobically curable monomer desirably comprises at least one acrylate or methacrylate ester group.

In a composition of the invention the anaerobically curable component may include at least one of: (meth)acrylated polyurethane resin with a molecular weight of less than about 1000 g/mol, (meth)acrylate monomers, including encapsulated (meth)acrylate monomers; and combinations thereof.

It will be appreciated that one or more reactive species may be microencapsulated. For example anaerobically curable monomer may be encapsulated. If the anaerobically curable monomer is liquid, encapsulation helps with preparation of a composition in solid form.

In general where a composition of the invention includes an anaerobically curable monomer in liquid form this will be less than 50% (by weight based on the total weight of the composition) of the overall anaerobically curable monomer present. The major part will be anaerobically curable monomer in solid form.

Where any species is encapsulated for example microencapsulated it can be added to the composition at a stage after a particulate form has been prepared. For example after grinding, for example milling has occurred. This means that the encapsulated material is not released from its encapsulated form before incorporation into a composition of the invention.

For example one encapsulated anaerobically curable monomer is ethoxylated bisphenol A dimethacrylate available under the trade name GRUF Lipocapsules RD and available from Lipo Technologies Inc.

It will be appreciated that a composition of the invention does not have a liquid carrier component and thus can be considered to be essentially solvent-free, for example comprising less than about 1% solvent, such as less than about 0.5% solvent such as less than 0.05% such as less 0.01% by weight based on the total weight of composition. So an advantage of the present invention is that there is no liquid carrier required with the result that the composition comprises little or no solvent (for example organic solvent or water).

A (polyurethane) resin component for use in the present invention may be formed by reacting a polyol with a diisocyanate in the ratio of OH:NCO of 1 to at most 1.6, for example 1 to at most 1.5, such as about 1:1.4 e.g. 1:1.36. To that reaction product a (meth)acrylate may be reacted in the ratio of chemical equivalence of OH:NCO of at most 1.6 to 1, for example at most 1.5 to 1 such as 1.4:1 wherein the amount of OH includes that of the previously added polyol.

It will be appreciated that as the compositions of the invention are solid, they may be provided in any designed form/shape.

For example, the present invention provides an article of manufacture comprising an anaerobically curable composition comprising at least one reactive component, the composition being in solid form and having a structural integrity imparted by said at least one reactive component of the composition, the structural integrity being sufficient to allow the article to be handled unsupported without failure.

An article made from a composition of the invention is desirably flexible. Desirably it is sufficiently flexible to be wrapped partially about, or wound around a substrate to which it is applied.

For example, if in the form of a tape, an elongate filament, a gasket, a patch it may be sufficient flexible to be wrapped partially about, or wound around a substrate to which it is applied.

As discussed above, because the materials are solid, yet reactive, they can be provided in the form where they can be handled directly that is where they are not applied on a substrate, but instead can be made into articles consisting of the material itself (and nothing else) in a shape/form that is required.

Furthermore, the article of manufacture may be provided in curable solid tack-free form. This means that there will be no soiling of any equipment or packaging etc. comes into contact with the article.

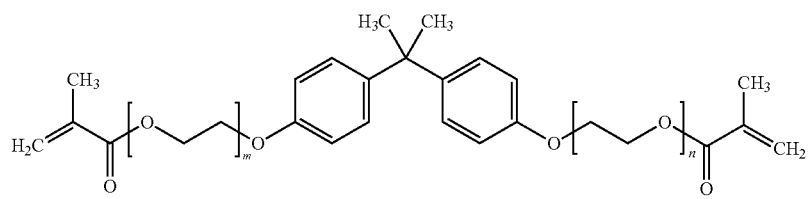

where m and n are each independently integers and m+n=2.

Encapsulation may be achieved by including a urea-formaldehyde polymer such as CAS 9011-05-6. Encapsulation may be achieved by including a gelatin material such as CAS 9000-7-8. Encapsulation may be achieved by including a resorcinol material (1,3-benzenediol) such as CAS no. 108-46-3. Combinations of same may be utilised for encapsulation. For example, combinations of these materials may be used to encapsulate ethoxylated bisphenol A dimethacrylate.

For example, it is possible to provide articles consisting of the anaerobically curable material itself in the form of a stick (for example for hot melt type applications), a tape, an elongate filament, a gasket, a patch, or a 3-D printed form. It will be appreciated that because a composition of the invention can be applied in melted form, it lends itself to being melted and then formed into a desired shape, for example by extrusion, by casting or moulding, or by building up layers of material such as can be achieved with a 3D printing arrangement. When the material (re-) solidifies it will retain the shape/form applied to it.

An article of manufacture may be provided in the form of a dispenser from which the article may be dispensed, including a stick dispenser or a tape dispenser.

An article of manufacture according to the invention can be formed from a composition of the invention. This may be done, for example, by melting of the composition of the invention, imparting a desired form, for example by casting, moulding or extruding, and allowing the composition to re-solidify.

The invention also relates to a method of providing a threadlocking composition on the threads of a threaded article to be thread locked comprising the steps of:
(i) providing in a solid tack-free form a composition according to the invention;
(ii) applying the composition to the threads of article so as to fuse it by melting to the threads.

It will be appreciated, that the melted form is sufficient for application. No liquid carrier is required.

It will also be appreciated that the composition itself may be heated until it is melted, a substrate to which it is to be applied may be heated so as to melt the composition, or a combination of heating the composition and heating the substrate may be utilised.

It is desirable that in a method of the invention the threads of an article to be thread locked are heated to a temperature sufficient to melt the threadlocking composition.

Where a composition of the invention is provided in an at least two-part form those two parts may be separately applied.

It will be appreciated that the present invention also provides a method of threadlocking two threaded articles together comprising:
(i) providing a threadlocking composition according to the invention;
(ii) applying the thread locking composition to the threads of at least one article so as to fuse it by melting to the threads;
(iii) subsequently, (and optionally after active or passive cooling) threading the two articles together so as to initiate anaerobic cure of the threadlocking composition thus anaerobically curing the composition so as to chemically bond the two articles together.

The present invention also relates to an article, for example a bolt or nut, to which a composition according to the invention has been applied. It will be in an uncured form and in a form suitable for later anaerobic cure.

The composition of the invention may include (as a resin) a (long chain) meth(acrylated) polyurethane for example:

where n is an integer from 2 to 10 for example a compound of the above formula having a molecular weight of about 6,000 g/mol may have a melting point of 75° C. to 85° C.

The composition of the invention may include (as a resin) a novolac vinyl ester for example

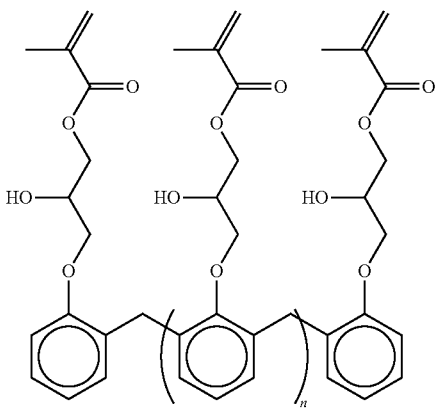

where n is an integer from 2-10. For example a compound of the above formula having a molecular weight of about 6,000 g/mol may have a melting point of 75° C. to 85° C.

The composition of the invention may include (as an anaerobically curable monomer):

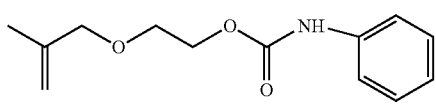 [SMILES: C=C(C)COCCOC(=O)Nc1ccccc1]

which is 2-methacryloxyethylphenylurethane with a melting point of about 70°–75° C.

It will be appreciated however that compositions of the invention may be dry to the touch after a short time, for example after about 30 minutes.

The composition of the invention may be formulated as a one-part or two (or more) part composition. It is desirable that the composition or each part of the composition is solid and optionally is in a flowable form. For example it may be desirable that the composition or each part of the composition is in flowable particulate form, for example powder form.

Provided of course that the anaerobically curable component has a melting point in the range from about 30° C. to about 100° C. it can be selected from any suitable anaero-

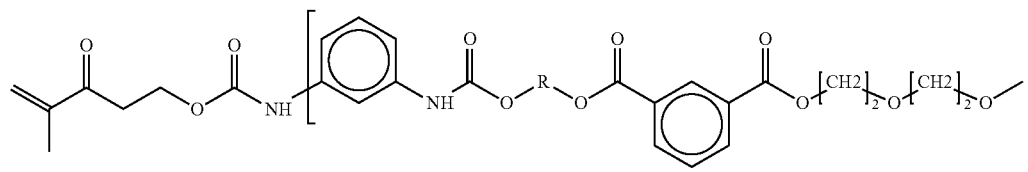

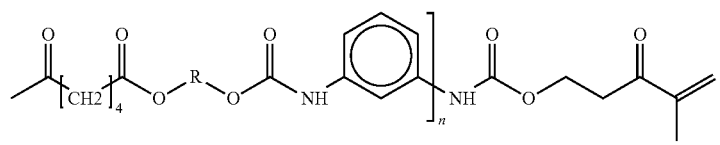

bically curable materials (or any combination of the materials) including those set out below.

Anaerobic curable compositions may have an anaerobically curable component based on a suitable (meth)acrylate component.

One or more suitable (meth)acrylate components may be selected from among those that are a (meth)acrylate monomer having the formula: $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

One or more suitable (meth)acrylate monomers may be chosen from among polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

For example the anaerobically curable component may include (as an anaerobically curable monomer) bisphenol A dimethacrylate:

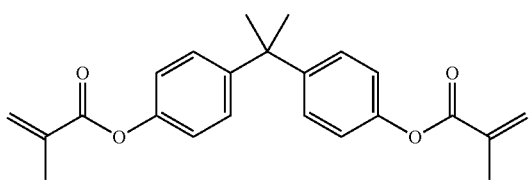 [SMILES: C=C(C)C(=O)Oc1ccc(C(C)(C)c2ccc(OC(=O)C(=C)C)cc2)cc1]

which has a melting point of approximately 72° C. to 74° C.

Still other (meth)acrylate monomers that may be suitable for use herein are silicone (meth)acrylate moieties ("SiMA"), such as those taught by and claimed in U.S. Pat. No. 5,605,999 (Chu), the disclosure of which is hereby expressly incorporated herein by reference.

Other suitable monomers may be chosen from polyacrylate esters represented by the formula

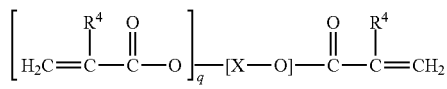

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

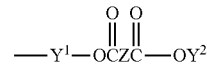

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other monomers may be chosen from the reaction products of di- or tri-alkylolamines (e.g., ethanolamines or propanolamines) with acrylic acids, such as are disclosed in French Pat. No. 1,581,361.

Suitable oligomers with (meth)acrylate functionality may also be used. Examples of such (meth)acrylate-functionalized oligomers include those having the following general formula:

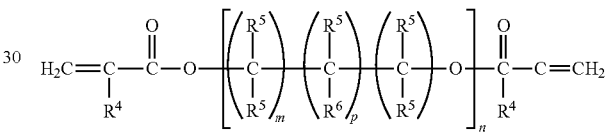

where $R^5$ represents a radical selected from hydrogen, alkyl of from 1 to about 4 carbon atoms, hydroxy alkyl of from 1 to about 4 carbon atoms, or

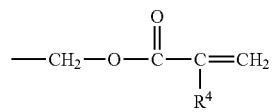

where $R^4$ is a radical selected from hydrogen, halogen, or alkyl of from 1 to about 4 carbon atoms; $R^6$ is a radical selected from hydrogen, hydroxyl, or

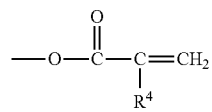

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used.

Suitable compounds can be chosen from among are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use may be chosen from among those of the formula

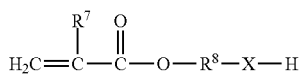

where X is selected from —O— and

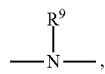

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with an isocyanate, yield a monomer of the following general formula:

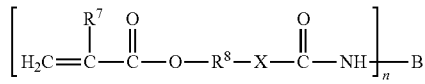

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 g/mol up to about 5,000 g/mol) or in the polymer class (such as about greater than 5,000 g/mol).

Of course, combinations of these (meth)acrylate monomers may also be used.

Desirably the anaerobically curable component comprises at least one acrylate or methacrylate ester group.

Desirably the anaerobically curable component comprises is chosen from at least one of epoxy (meth)acrylates, urethane (meth)acrylates, urethane di(meth)acrylates, alkyl (meth)acrylates, stearyl (meth)acrylates, isocyanurate (meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth)acrylates.

For example the anaerobically curable component may include (as an anaerobically curable monomer) diisocyanates capped with hydroxyethyl methacrylate such as:

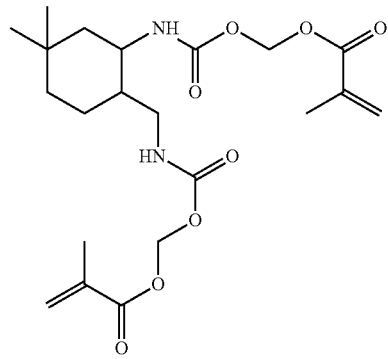 [SMILES: C=C(C)C(=O)OCOC(=O)NCC1CCC(C)(C)CC1NC(=O)OCOC(=O)C(=C)C]

which is HEMA-IPDI-HEMA with a melting point of about 72° C. to −74° C.: or

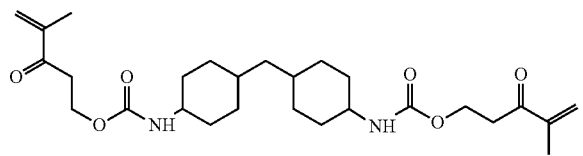 [SMILES: C=C(C)C(=O)CCOC(=O)NC1CCC(CC2CCC(NC(=O)OCCC(=O)C(=C)C)CC2)CC1]

which is HEMA-hMDI-HEMA with a melting point of about 75° C. to 85° C.: or

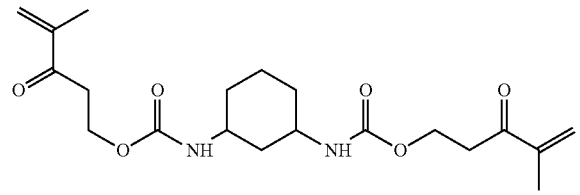 [SMILES: C=C(C)C(=O)CCOC(=O)NC1CCCC(NC(=O)OCCC(=O)C(=C)C)C1]

which is HEMA-6HXDI-HEMA (referred to as "RRT600" "in the Examples below) with a melting point of about 75° C. to 85° C., or

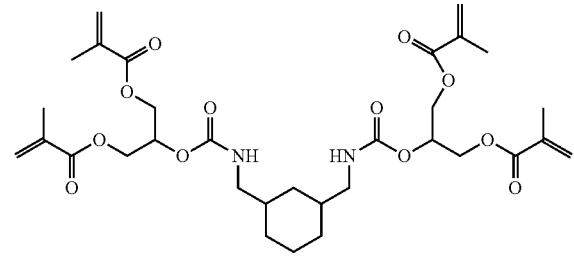 [SMILES: C=C(C)C(=O)OCC(COC(=O)C(=C)C)OC(=O)NCC1CCCC(CNC(=O)OC(COC(=O)C(=C)C)COC(=O)C(=C)C)C1]

which is Glycerol Dimethacrylate-6HXDI-Glycerol Dimethacrylate (referred to as "4RRT600" "in the Examples below) with a melting point in the range from about 75° C. to 85° C.

The inventive compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Compositions of the present invention may further comprise thickeners and/or fillers.

As mentioned above it will be appreciated that the composition of the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, PTFE, mica, polyamide wax, titanium dioxide, and barium sulphate.

The present invention also provides methods of preparing and using the inventive anaerobic adhesive compositions, as well as the reaction products of the compositions.

The compositions of the present invention may be prepared using conventional methods which are well known to those persons of skill in the art. For instance, the components of the inventive composition may be mixed together in any convenient order consistent with the roles and functions the components are to perform in the compositions. Conventional mixing techniques using known apparatus may be employed.

The (meth)acrylate component may comprise from about 25 to about 95 percent by weight of the composition or may comprise from about 40 to about 90 percent by weight of the composition, such as from about 45 to about 85 percent for example such as about 45 to about 70 percent by weight, based on the total weight of the composition.

DETAILED DESCRIPTION

An example of a composition that may be considered a basis for formulating solid anaerobic formulations is given below in Table 1:

TABLE 1

Solid Anaerobic Formulation

| Component | Wt % |
|---|---|
| Solid resin component | 10-60 |
| Solid anaerobically curable monomer | 40-85 |
| Cure System | 0.1-10 |
| Total | 100 |

The resins and monomers are in general in solid form at room temperature and have a melting point of <100° C. The monomer component above is desirably all solid monomer, but optionally can include up to about 30% (of the overall composition by weight) of liquid monomer. The liquid monomer can be added directly as a liquid to the composition or may be encapsulated. When encapsulated the encapsulated monomer may be present in an amount up to about 30% (of the overall composition by weight).

Examples of types of materials that could be used are given below in Table 2.

TABLE 2

Examples of types of resins, monomer and initiators that can be used to prepare solid anaerobic formulations.

| Resins | Monomers | Initiators |
|---|---|---|
| Long chain (Meth) acrylated Polyurethane resins (MW >2,000 g/mol) | Short chain (Meth)acrylated PU resin with mp 50-80° C. | Peroxides |
| Novolac Vinyl esters | (Meth)acrylate monomers with mp 50-80° C. Encapsulated (meth)acrylate monomers | Encapsulated peroxides |

Preparation

The raw materials are formulated together at a temperature just above the melting point of the individual components. When the formulation has a homogeneous appearance, it is allowed to cool to room temperature.

Application

The substrate chosen for coating here are bolts. The formulation is heated to below about 100° C., for example 80° C., until the formulation becomes liquid. The liquid formulation is applied to the substrate. The liquid formulation can be applied to the substrate by any suitable means, for example, spraying, dipping, to form a coating on the substrate. As the temperature of the coating is reduced the coating solidifies. The cooling process can be expedited by active cooling, e.g. placing the substrates in a freezer.

The composition can be applied at a temperature of less than 100° C. It can have a variable profile because the amount of the composition that is applied can be varied to suit the application in question. It is an anaerobically curable system so curing in the presence of air is not possible meaning a composition of the invention shows great stability until it is placed in an environment where oxygen (air) is excluded. It shows superior vibration resistance. It also shows improve thermal performance. It also has improved chemical resistance. It also shows improved strength performance after one hour. It also shows improved strength performance after 2 hours. It also shows improved strength performance after 4 hours. It can also be utilised with current application systems for example without modifying current dispensing equipment.

EXAMPLES

The formulations of Example 1 below were prepared as described above under "Preparation" and were applied to a bolt as under the heading "Application".

Testing was carried out for Example 1 by application to black oxide coated mild steel bolts with mild steel nuts (BO/MS).

For each test five of those bolts were used and an average value taken. Nuts of the appropriate type as described above were then applied to the bolts to a torque of >1 N·m to initiate anaerobic cure. After time intervals of 1 hour, 2 hours, and 4 hours the average break torque required to move the nut relative to the bolt was measured in accordance with ISO 10964. After 1 hour, 2 hours, and 4 hours the average prevail torque required to was measured after the initial breakage of the bond at a specified angle of 180° of rotation of the nut in accordance with ISO 10964.

Example 1

TABLE 3

Comparative compositions which do not contain a metallocene

| Material | \multicolumn{7}{c}{Sample (comparative)} | | | | | | |
|---|---|---|---|---|---|---|---|
| | A | B | C | D | E | F | G |
| | \multicolumn{7}{c}{Parts by weight} | | | | | | |
| Di-functional methacrylated polyurethane resin from semi crystalline polyol | 35.13 | 35.13 | 35.13 | 35.13 | 35.13 | 35.13 | 35.13 |
| 2-Methacryloxyethylphenylurethane | 35.13 | 35.13 | 35.13 | 35.13 | 35.13 | 35.13 | 35.13 |
| Ethoxylated Bisphenol A Dimethacrylate | 25.71 | 25.71 | 25.71 | 25.71 | 25.71 | 25.71 | 25.71 |
| n-butyl Ferrocence | 0 | 0 | 0 | 0 | 0 | 0 | 0 |
| Benzoyl peroxide microcaps | 4.03 | 4.03 | 4.03 | 4.03 | 4.03 | 4.03 | 4.03 |
| Acetyl phenyl hydrazine | 0 | 0.5 | 1 | 1.25 | 1.5 | 1.75 | 2 |

TABLE 4

Compositions according to the present invention

| Material | H | I | J | K | L | M |
|---|---|---|---|---|---|---|
| | \multicolumn{6}{c}{Parts by weight} | | | | | |
| Di-functional methacrylated polyurethane resin from semi crystalline polyol | 34.85 | 34.85 | 34.85 | 34.85 | 34.85 | 34.85 |
| 2-Methacryloxyethylphenylurethane | 34.85 | 34.85 | 34.85 | 34.85 | 34.85 | 34.85 |
| Ethoxylated Bisphenol A Dimethacrylate | 25.5 | 25.5 | 25.5 | 25.5 | 25.5 | 25.5 |
| n-butyl Ferrocence | 0.25 | 0.5 | 1.0 | 1.5 | 2.0 | 2.5 |
| Benzoyl peroxide microcaps | 3.96 | 3.96 | 3.96 | 3.96 | 3.96 | 3.96 |
| Acetyl phenyl hydrazine | 1 | 1 | 1 | 1 | 1 | 1 |

The results of testing with the compositions of Example 1 are set out in Tables 5 and 6.

TABLE 5

Results of break strength testing

| Sample | \multicolumn{3}{c}{Break strength (Nm)} | | |
|---|---|---|---|
| Time (hours) | 1 | 2 | 4 |
| A (comparative) | 0 | 0 | 0 |
| B (comparative) | 0.5 | 0.5 | 0.5 |
| C (comparative) | 0.6 | 1.7 | 3.5 |
| D (comparative) | 0.4 | 0.5 | 5.6 |
| E (comparative) | 0.7 | 0.6 | 5.9 |
| F (comparative) | 0.6 | 0.7 | 8.5 |
| G (comparative) | 0 | 0 | 0.4 |
| H | 5.3 | 4.9 | 10.0 |
| I | 6.6 | 7.1 | 6.1 |
| J | 4.8 | 4.6 | 9.6 |
| K | 2.7 | 3.8 | 6.2 |
| L | 3.2 | 7.1 | 4.7 |
| M | 3.8 | 7 | 7.5 |

TABLE 6

Results of prevail strength testing

| Sample | \multicolumn{3}{c}{Prevail strength (Nm)} | | |
|---|---|---|---|
| Time (hours) | 1 | 2 | 4 |
| A (comparative) | 0 | 0 | 0 |
| B (comparative) | 0.4 | 0.3 | 0.3 |
| C (comparative) | 0.3 | 0.9 | 1.7 |
| D (comparative) | 0.3 | 0.4 | 2.6 |
| E (comparative) | 0.3 | 0.4 | 3.0 |
| F (comparative) | 0.4 | 0.4 | 5.4 |

TABLE 6-continued

Results of prevail strength testing

| Sample | Prevail strength (Nm) | | |
| --- | --- | --- | --- |
| Time (hours) | 1 | 2 | 4 |
| G (comparative) | 0 | 0 | 0.2 |
| H | 3.4 | 2.7 | 4.5 |
| I | 3.5 | 4.5 | 2.9 |
| J | 2.2 | 3.0 | 5.4 |
| K | 1.0 | 1.5 | 2.4 |
| L | 1.7 | 4.6 | 2.0 |
| M | 2.8 | 2.9 | 4.0 |

The anaerobically curable compositions of the present invention detailed above in Example 1 provided excellent adhesive performance on black oxide coated mild steel. The addition of a metallocene as a cure accelerator provided a composition which had higher break strength at 1 hour, at 2 hours, and at 4 hours, than compositions in which do not comprise a metallocene. This was confirmed by measuring the breakaway torque values and prevailing torque values in accordance with ISO 10964, the results of which are given in Tables 5 and 6.

Example 2

Examples of starting materials used in the resin synthesis are provided.
Polyols:
    (Semi)-crystalline polyester polyols such as those available from Evonik under the Dynacoll® trade name e.g. Dynacoll® 7380, 7381, 7362
Isocyanates:
    Toluene diisocyanate
    Methylene diphenyl isocyanate
    Hydrogenated Xylylene diisocyanate
Capping Agents:
    Hydroxyethyl methacrylate
    Glycerol dimethacrylate
Example of Resin Synthesis:
    Charged Dynacoll® 7380 (90.89 g), BHT (butylated hydroxytoluene) (0.03 g), MEHQ (4-methoxyphenol) (0.03 g) and phosphoric acid (0.007 g) to the reaction vessel and mixed while heating to 120° C. Allowed temperature to decrease and mixed for 20 minutes at 100° C. Added DBTDL (dibutyltin dilaurate) (0.037 g) with mixing and then slowly added the TDI (toluene diisocyanate) (6.28 g) into the vessel, maintaining the temperature at 100° C. throughout the reaction. Continued mixing for 2-3 hours or until % wt Isocyanate (NCO) reached equilibrium. Titrated for remaining NCO. Added 90% of the required HEMA (hydroxyethyl methacrylate) (~2.5 g) based on titre. Added DBTDL (0.037 g). Allowed to react for 3 hours and monitored the NCO consumption via titration. Where the % NCO remaining is >0.2% charged the calculated 2nd addition of HEMA. Stopped the reaction when NCO content is <0.2%.

Example 3

The formulation of Example 3 below were prepared as described above under "Preparation".

| Comparative Sample N | Wt % |
| --- | --- |
| Material | |
| Dynacoll 7380 | 34.65 |
| 2-Methacryloxyethylphenylurethane | 34.65 |
| Ethoxylated Bisphenol A Dimethacrylate | 25.07 |
| n-butyl Ferrocence | 0.11 |
| Benzoyl peroxide microcaps | 4.0 |
| Acetyl phenyl hydrazine | 1.12 |
| Saccharin | 0.4 |
| Total | 100 |

Stability testing was performed on Sample N which comprises saccharin. The comparative sample N was maintained in an aerobic environment while being heated to 40° C. to simulate accelerated aging in an aerobic environment. Within 3 days of exposure to accelerated aging in an aerobic environment Sample N had cured. The compositions which fall within the scope of the present invention will not polymerise under aerobic conditions. The compositions of the present invention were tested for 12 days at 40° C. to simulate accelerated aging in an aerobic environment. The compositions according to the invention had not cured.

The addition of saccharin leads to a composition which is no longer anaerobically curable but is aerobically curable.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed:

1. An anaerobically curable composition comprising:
(i) a curing system for curing an anaerobically curable component; wherein the curing system comprises a curing accelerator, the curing accelerator comprising a metallocene and acetyl phenyl hydrazine;
(ii) the anaerobically curable component comprising: a solid resin component, and a solid anaerobically curable monomer;
wherein the composition is solid and has a melting point in the range from 30° C. to 100° C.

2. The composition according to claim 1 wherein the composition does not contain saccharin.

3. The composition according to claim 1 wherein the composition is a threadlocking composition.

4. The composition according to claim 1 wherein the metallocene is a ferrocene.

5. The composition according to claim 1 wherein the metallocene is n-butyl ferrocene.

6. The composition according to claim 1 where the metallocene is present in the amount from about 0.05% to about 2.5% by weight based on the total weight of the composition.

7. The composition according to claim 1 where the acetyl phenyl hydrazine is present in the amount from about 0.05% to about 1.75% by weight based on the total weight of the composition.

8. The composition according to claim 1 wherein the curing system does not contain saccharin.

9. The composition according to claim 1 wherein the anaerobically curable component acts as a carrier for at least the curing system of the composition; and/or wherein the composition re-solidifies when exposed to a temperature of 30° C. or lower, after melting; and/or
wherein the composition has a melting point from about 40° C. to about 100° C.

10. The composition according to claim 1 wherein the composition is in flowable particulate form.

11. The composition according to claim 1 wherein the solid resin component is anaerobically curable; and/or
wherein the solid resin component and the solid anaerobically curable monomer each have a melting point in the range from about 30° C. to about 100° C.

12. The composition according to claim 1, wherein the composition is provided in an at least two-part form and a first part comprises the solid resin component and a second part comprises the solid anaerobically curable monomer.

13. The composition according to claim 1, wherein the anaerobically curable component is provided in a flowable particulate form; and/or wherein the anaerobically curable component is provided in powder form.

14. The composition according claim 1, wherein the solid resin component is provided in a flowable particulate form; and/or wherein the solid resin component is provided in powder form; and/or wherein the solid anaerobically curable monomer is provided in a flowable particulate form; and/or wherein the solid anaerobically curable monomer is provided in powder form.

15. The composition according to claim 1, wherein the anaerobically curable component includes the product formed by melting the solid resin component and the solid anaerobically curable monomer and blending them and forming a solid blended product; optionally wherein the composition includes the product formed by reducing the solid blended product into a flowable particulate form.

16. The composition according to claim 1, wherein the particulate form has an average particle size of less than about 500 μm.

17. The composition according to claim 1, wherein the anaerobically curable component is present in an amount of from about 80% to about 99% by weight of the total composition.

18. The composition according to claim 1, wherein the solid resin component is present in an amount of from about 10% to about 60% by weight based on the total weight of the composition and/or wherein the solid resin component is selected from: (meth) acrylated polyurethane resins with a molecular weight of about 2,000 g/mol or higher; novolac resins with a molecular weight of about 2,000 g/mol or higher (meth)acrylated polyester resins with a molecular weight of about 2,000 g/mol or higher and combinations thereof.

19. The composition according to claim 1 wherein the anaerobically curable monomer is present in an amount of from about 40% to about 85% by weight based on the total weight of the composition.

20. The composition according to claim 1 wherein the solid anaerobically curable monomer comprises at least one (meth) acrylated polyurethane resin with a molecular weight of less than about 1000 g/mol, (meth)acrylate monomers, including encapsulated (meth)acrylate monomers; and combinations thereof.

21. The composition according to claim 1 wherein the curing system is present in an amount of from about 0.1% to about 10% by weight based on the total weight of the composition; and/or wherein the curing system comprises an encapsulated peroxide.

22. The composition according to claim 1 wherein the composition is solvent-free comprising less than 1% solvent by weight based on the total weight of composition and wherein the solvent is organic solvent or water; and/or wherein the composition is provided in curable solid form.

23. An article of manufacture comprising an anaerobically curable composition according to claim 1 the composition being in solid form and having a structural integrity imparted by the anaerobically curable component composition, the structural integrity being sufficient to allow the article to be handled unsupported without failure.

24. The article of manufacture according to claim 23 provided in curable solid tack-free form; optionally wherein the article is in the form of a stick, a tape, an elongate filament, a gasket or a patch and optionally further comprising a dispenser from which the article may be dispensed, including a stick dispenser or a tape dispenser.

25. A method of providing a threadlocking composition on the threads of a threaded article to be thread locked comprising the steps of:
(i) providing in a solid tack-free from a composition according to claim 1;
(ii) applying the thread locking composition to the threads of article so as to fuse it by melting to the threads;
and optionally further comprising step of:
(iii) heating the threads of an article to be thread locked to a temperature sufficient to melt the threadlocking composition; and/or wherein the composition is provided in an at least two-part form and those two parts separately applied.

26. A method of threadlocking two threaded articles together comprising:
(i) providing a threadlocking composition according to claim 1;
(ii) applying the thread locking composition to the threads of at least one article so as to fuse it by melting to the threads;
(iii) subsequently threading the two articles together so as to initiate anaerobic cure of the threadlocking composition and thus anaerobically cure the composition so as to chemically bond the two articles together; and further optionally wherein the threading the two articles together is carried out after active cooling; or wherein threading the two articles together is carried out after passive cooling.

27. An article having a surface to which a composition according to claim 1 has been applied.

* * * * *